Jan. 25, 1944.                A. WEIL                 2,340,256
                              ROACH RUN
                         Filed April 17, 1942
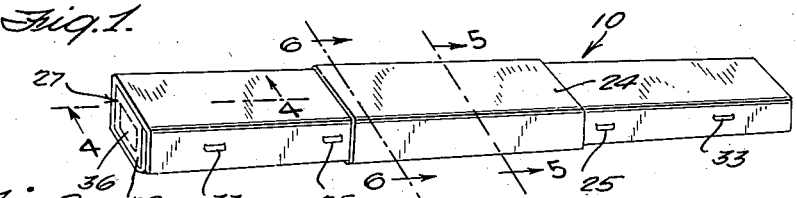
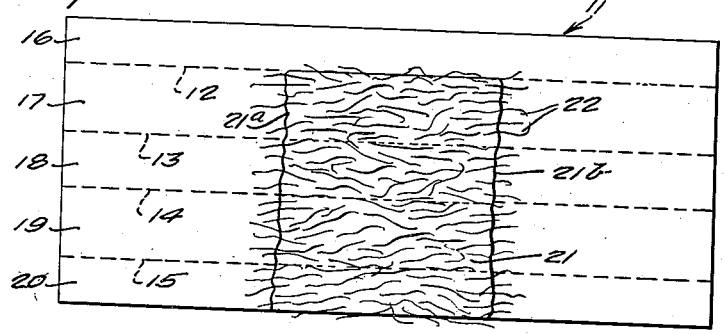
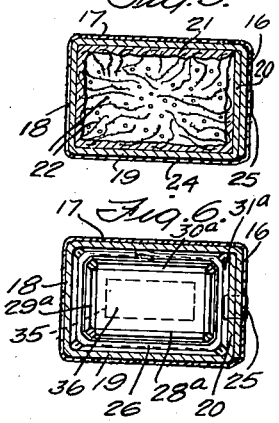
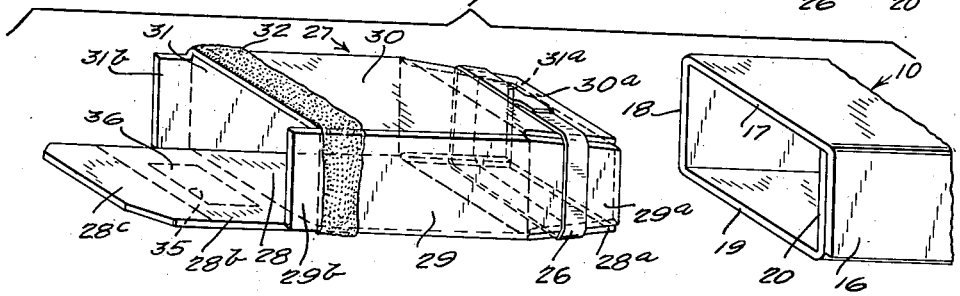
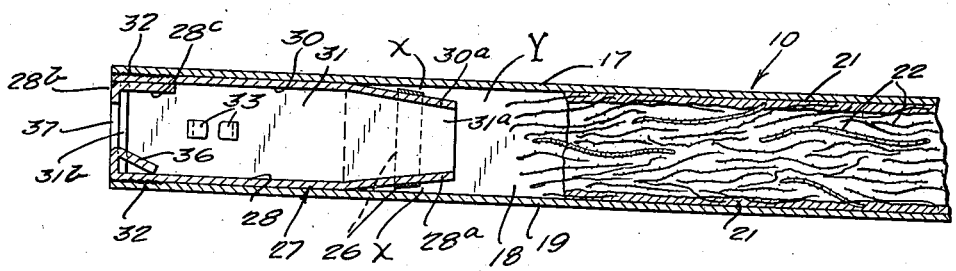
INVENTOR
ALEX WEIL
BY
William T Kuiemer
ATTORNEY Patented Jan. 25, 1944

2,340,256

UNITED STATES PATENT OFFICE 2,340,256

ROACH RUN

Alex Weil, New York, N. Y.

Application April 17, 1942, Serial No. 439,327

12 Claims. (Cl. 43—131)

This invention relates to the extermination of roaming or crawling insects, such as roaches.

One of the objects of this invention is to provide a practical, inexpensive device for safely containing a poisonous life-destroying substance, preferably in powder-like form, for luring or trapping insects, particularly of the above-mentioned nature, and capable of functioning efficiently and without loss therefrom of the poisonous substance and without material risk of contaminating with the latter the surroundings in which the device is used or without risk of contamination during handling. Another object is to provide, in a device of the above-mentioned nature, a simple, inexpensive and dependable means for effecting within the device a wide or substantial spread of the powdered poisonous material and to improve the feature of attraction or attractiveness from the viewpoint of the insect or the like that is to be exterminated. Another object is to provide multiple safety means to guard against egress or sifting of the powdered material or the like from the device and capable of dependable co-action toward achieving safety against the contamination of persons or animals, like household pets, or the surroundings in which the device is used.

Another object is to provide a device of the above-mentioned character that will be capable of easy, safe and rapid and inexpensive assembly. Another object is to provide a method of assembling such a device that may be efficiently carried on in practice and that will lend itself effectively to quantity production. Another object is to provide a device of the above-mentioned character that will have structural features closely simulating environments which insects such as the above-mentioned prefer or seek out, such as crevices, narrow dark spaces, and the like, and to provide such a device in a form that will have a wide range of placement or locational possibilities, thus making it possible to position it in a wide range of differing locations. Another object is to provide a device of the above-mentioned nature that will present in simple and inexpensive form physical features attractive to the insect to entice or encourage the insect to linger or remain in the device and thus increase the time element available for the insect to partake of the poisonous material directly through the mouth or by contact and subsequent absorption followed by direct intake in the course of grooming. Other objects will be in part obvious or in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the accompanying drawing, in which is shown a preferred one of the various possible embodiments of my invention, Figure 1 is a perspective view of a device showing it as it would be placed, for example, on a floor, table or the like, to be made ready for use;

Figure 2 is a plan view or development of a blank with certain other features, in one stage of construction of the device of Figure 1;

Figure 3 is a perspective view, broken away to show only one end of the device, illustrating certain possible steps of assembly, being on an enlarged scale; and Figures 4, 5 and 6 are sectional views on an enlarged scale as seen along the lines 4—4, 5—5 and 6—6 of Figure 1.

Similar reference characters refer to similar parts throughout the several views of the drawing.

Referring first to Figure 1, I have there indicated the device as a whole, which I term a "Roach Run," by the reference character 10 and indicated preferred general proportions where the device is to function with respect to insects such as roaches, and I prefer to construct it out of a suitable sheet material, such as cardboard or the like, of suitable stiffness or strength, sheet fibre or the like. I preferably give the device a relatively very small cross-section compared to its length, making it up in tube-like form, and preferably constructing it the same at its two ends, though only one of such preferably identical end constructions is shown in detail in the drawing. For purposes of better illustration, let it be assumed that the insect to be dealt with is a roach and illustrative suitable dimensions, given herewith not by way of limitation, may comprise an overall length on the order of 9" and, where the device is rectangular in cross-section, it may have an internal width on the order of ⅞" and an internal height on the order of ½".

When made of cardboard or other sheet material, I preferably start with a blank generally indicated at 11, in Figure 2, and this blank I provide with longitudinal score lines 12, 13, 14 and 15, thereby providing five panels 16, 17, 18, 19 and 20 of which panels 16 and 20, when the blank is folded about the score lines, are brought into overlapping relation and suitably secured together to retain the structure in tube-like form.

However, before folding the blank 11 as above described, I apply to the panels 17, 18, 19 and 20, preferably throughout central portions thereof a layer of material which, and also as to its preferred area of application, is indicated in Figure 2 by the reference character 21, its terminal edges 21ª and 21ᵇ being preferably very substantially spaced from the respective ends of the channels, for example, on the order of 3" or 4" in the above-assumed illustrative dimensional aspects and such spacing I preferably provide where the material 21 contains or carries a poisonous substance.

The material 21 preferably has suitable adhesive characteristics and is preferably compounded to be of low viscosity and it may be sort of semi-fluid or it may be plastic or pasty. A wide range of choice of materials of this character is available for functioning as is later described, and it will be sufficient if I set out only one or two illustrative forms of material.

For example, the material 21 may comprise any suitable, preferably thick, syrup, having sweetening therein, where it is desired that it is to function also as a food lure; most syrups are sticky or adhesive and many of them do not dry out too quickly. They may be easily applied as by painting or smearing a suitable layer thereof throughout the area indicated in Figure 1 and the layer is of suitable thickness to coact with other elements as is later described. A suitable poisonous ingredient, such as sodium fluoride, may or may not be initially mixed with the syrup as may be desired.

Or the material 21 may be made up in the form of a semi-plastic or pasty batch, utilizing such ingredients as clay or other fillers and glycerine or the like, with or without a poisonous ingredient such as sodium fluoride, and as such a pasty batch, it may be spread by any suitable means over the desired area, adhering to the face of the blank, and being preferably applied in a layer of a thickness appropriate to coact with other elements later described. Such a pasty material has suitable adhesive characteristics to fasten itself to the panel faces and also to retain adhered thereto or embedded therein other parts or elements later described. Such a material has little or no mobility or flow under normal or usual conditions of use, and it may be made up to have lesser mobility than the above-mentioned syrups, or such syrups may have mixed into them a suitable filler in powder form like wood flour, china clay or the like, to diminish, if desired, their mobility or tendency to flow.

Having thus prepared the blank 11 with material 21 of suitable area, I next lay onto the layer of material 21 a suitable number of fibres of appropriate material, utilizing preferably fibres that are relatively long and relatively none-too-flexible or none-too-straight; these are applied preferably more or less lengthwise of the longitudinal axis of the blank 11 and in quantity with due regard to the cross-sectional dimensions of the device and the characteristics of the form of life, such as a roach in the assumed illustration, which the device is to cope with. Preferably also the fibres have suitable properties of mechanically retaining on their surfaces the fine particles of a powdered material, as by the rough or barbed or splinter-like character of the surfaces, or the fibres may be treated in any suitable way, as by applying a light coating of an adhesive material in liquid form.

An illustrative fibrous material to employ are vegetable fibres like hemp fibres, such as are embodied in the making of rope or cords, the fibres as used preferably having an initial series of twists or curvatures in them so that when brought together in a suitable layer, as above described, they do not simply stack together in parallelism. Animal fibres, vegetable elements like straw, or components thereof, metal shavings like steel wool and others may be employed, and according to their individual characteristics, they may or may not need to be laid more or less lengthwise of the longitudinal axis. In the drawing, the layer of fibres and the fibres themselves are indicated by the reference character 22.

Such of the fibres or such portions of the fibres as directly engage the material 21 are held in place by the adhesive qualities of the latter or by becoming embedded in part therein and such of the fibres as do not directly engage the material 21 are held against dislodgement by being intermingled with and engaged by such fibres as are held in place by the material 21.

Thus, for example, the fibres may be made up into a sort of loose pad or layer comparable in width to the distance from the score line 12 to the score line 15 and in length preferably somewhat greater than the dimension of the material 21 in the direction of the axis, and such a pad may be laid down as a unit onto the material 21, the fibres directly engaging the material holding the entire pad in place.

It is preferably at this stage, though I may do it at a later stage, that I then apply onto the layer of loosely intermingled fibres the poisonous material and the latter preferably is in powdered form, such as powdered sodium fluoride and, in such case, I sprinkle or spread a suitable quantity thereof onto the bed of fibres; the powdered material becomes attached to the surfaces of the fibres, some of it becomes retained in small masses where fibres form pocket-like supports, and some of it sifts through the bed of fibres onto the material 21 which, being plastic or adhesive, retains the poisonous powdered material and where the material 21 is not initially of a poisonous nature, it is by this operation contaminated and becomes a poisonous food lure. As indicated in Figure 2, the fibres 21 preferably extend beyond the right and left ends of the area or material 21 and thus overlie also portions of the panels of the blank that are not coated with the material 21.

The blank, thus provided with the elements 21 and 22, is now folded about the score lines 12, 13, 14 and 15 into tube-like form, to bring the securing panel 16 into overlapping relation to the panel 20 (see Figures 5 and 6) and secured in its tube-like form, as by wrapping about its middle portion an adhesive tape or band 24 or by the use of a mechanical securing device such as a light sheet metal or wire clamp or rivet 25 (Figures 1 and 6).

The thickness of the layer of fibres 22 as applied to the blank 11 in Figure 2 is preferably proportioned also with respect to the above-mentioned folding operation in that it is preferred or desired that, when the blank is folded into tube-like form as appears better in Figure 5, the cross-sectional area is, for roaches, substantially entirely filled with loosely arranged fibres and the resultant mass of fibres is not unduly compressed or compacted. For roaches, the fibres are in number and arrangement as to compacting preferably such that they present more or less longitudinally extending interstices between and amongst them to permit a roach to crawl or in effect burrow therealong, but without offering undue resistance. Where something other than roaches are to be coped with, suitable presence or absence of such proportioned compacting is effected. It will also be noted that the presence of the fibres is also an inducement to nesting.

Such activity of the roach or the like is further facilitated or encouraged by the generally long and narrow interior of the device 10, thus simulating, in addition to the resultant darkness, crevices and dark narrow spaces which they naturally seek out elsewhere as hiding or living places and I preferably provide for freedom of entry and exit at both ends of the tube-like structure. But preferably I make provision to lessen the entry of light into the open end or ends of the device and also to lessen the chance of any of the poisonous material within the device from escaping therefrom and for these purposes I preferably employ, at the open end or ends of the device, an internal end structure such as that generally indicated in Figure 3 by the reference character 27.

The safety end or terminal structure 27 is preferably made of a sheet material, like cardboard, and is made up of a blank to provide a tube-like structure having a bottom wall 28, a side wall 29, a top wall 30 and a companion side wall 31, of which one of the side walls may be of two overlapping panels adhesively secured together. These are dimensioned as to external cross-section to snugly slide or fit into the end of the tube-like housing 10 and at its inner end the structure 27 has trapezoidal flap extensions 28a, 29a, 30a and 31a of the walls 28, 29, 30 and 31, respectively, there being score lines as indicated in Figure 3, to permit these flap extensions to be bent or folded toward the longitudinal axis to an extent permitted by the trapezoidal shapes of the extensions, whence they are preferably secured so folded, by any suitable means, such as an adhesive tape 26 of paper, or the like. These extensions are thus brought and held inwardly away from the respective inside walls of the housing 10, as appears better in Figures 4 and 6, when the safety structure 27 is inserted into the end of the tube-like structure, and the joints between the flaps are also sealed. When so inserted, it is preferably held in place by an adhesive 32 (Figure 3) applied preferably throughout a peripheral band portion, as indicated in Figure 3, adjacent the outer end of the structure 27 so as to seal the walls 28, 29, 30 and 31 of the safety terminal structure 27 externally to the internal faces of the walls or panels 19, 20, 17 and 18, respectively, of the tube-like housing. Or any other suitable securing means may be employed such as a rivet or wire staple, or the like, as indicated at 33 in Figures 1 and 4.

Preferably, each safety terminal insert 27 is constructed, where it is desired to achieve certain other features and advantages, to be closed off at its outer end, but in such a way as to permit the making of an opening when the device is put to use. An illustrative and preferred structure for this purpose may be like that shown in Figure 3, where the safety terminal 27 has its side walls 29 and 31 provided with short flap extensions 29b and 31b which may be folded inwardly toward each other, whence they are closed over by a multiple flap extension 28b of the bottom wall 28, a flap portion 28c being tucked inwardly to underlie the top wall 30. In the flap part 28b score lines or perforations 35 outline part 36 preferably rectangular in shape, for a purpose later described.

With both ends thus closed, the device may be freely handled as in packing, shipping and in placing it in position for use, without real risk of any of the poisonous material, whether in powdered form or otherwise, sifting or otherwise emerging from the interior. When ready to be put in place for use, the part 36 of the two end closing flaps or walls 28 is broken or torn out along the lines 35 of scoring or perforations, or as is preferred, it is broken from the flap wall 28 only along the upper and the two side boundaries of the part 36, whence it may be folded outwardly or inwardly as may be desired (in Figure 4 it is shown folded inwardly), thus exposing an entry opening 37 and leaving, in the latter case, the flap 36 to form a sort of ramp. Thus prepared, the device may now be placed at any strategic location, usually in some narrow space, that is frequented or traversed by roaches and the latter may freely enter at either of the openings 37 and thereafter, if still able to, they may exit therethrough.

As better appears from Figures 4, 5 and 6, a roach entering the open end of the device is attracted further into it by the element of darkness, the portions of the end flap 28 surrounding the opening 37 cutting down on the possible amount of light entering the long and narrow space. If the material 21 which will be seen preferably to extend about the inner walls, functions also as a food lure, that factor aids in further attracting the roach further into the interior. It may thus pass through the internal safety structure 27, the inner mouth end of which, though restricted by the inward lay of the trapezoidal end flaps, permitting free and unrestricted passage therethrough of the roach whence it encounters the loosely compacted mass of fibres 22 covered by or carrying on their surfaces the powdered poisonous substance, as indicated by the stipling.

I have found that such an arrangement of fibres is considerably to the liking of roaches for they proceed to make their way into the mass, the large spaces between the fibres being appropriate for their passage but offering some resistance, a resistance which, however, the roach easily overcomes, for the fibres are of sufficient looseness of assembly so that they may be readily individually or collectively flexed as the roach crawls or pushes forwardly. Apparently here the roach finds a simulation in its efforts to make a passage analogous to its efforts in making its way through narrow cracks or small crevices, or the like, in furniture, flooring, walls and the like.

The roach may partake directly of the poisonous material carried by the fibres and it will be noted that it cannot make its way into them without having the material rub off of the fibrous strands or fibres and onto its own body and pretty much distributed also throughout the latter. The poisonous material may be absorbed through the body or it may be taken into the system directly in the course of subsequent grooming. In constructing the device in the above-described manner, that is, by rolling or folding the blank 11 up with the fibrous bed or blanket already attached thereto by the material 21, it is possible to have the fibrous layer of such thickness that when two portions of it become juxtaposed, as when the panels 17 and 19 (Figure 5) become so juxtaposed, there is left a narrow channel between these juxtaposed layers, or suggestions of one or more channels, or simply a greater looseness of fibres, thus further to facilitate the passage of the roach, and such an arrangement is of advantage where the form of life to be coped with has nesting instincts since it facilitates the forming or making of a sort of nest, thus furthering the possibilities of acquisition of the poisonous material by contact.

Or the roach might make its way to the material 21, particularly where it has elements of food value, and containing or having on its surface the poisonous ingredient, such as results in the latter instance from its retention of the powdered form of poison when the latter was sifted in place, and the roach may thus also acquire a lethal dose.

If the roach makes it way out of the device, its death should ensue while, on the other hand, the mechanical and physical interior arrangement, such as the loosely compacted fibres, tend to cause it to tarry with the result that, due to the poisonous material that has been taken into its system, it is sometimes so weakened that it cannot make its way out of the pad of fibres, whence it expires within the device.

During handling of the device, even after the openings 37 have been effected, substantial safety ensues. The fibres 22 individually and collectively act as a good retaining medium, holding and catching any shifting powdered material, while the adhesive nature of the material 21 holds the fibres themselves against shifting toward the open end or ends of the device and also acts to hold such powdered material as comes in contact with it.

Should any of the powdered material shift beyond the end edges 21ª, 21ᵇ of the material 21 or otherwise reach an uncoated portion of the interior walls of the housing, the trapezoidal flaps 28ª, 29ª, 30ª or 31ª, as the case may be, in forming with the companion walls of the housing 19 itself, long acute-angled spaces as indicated at X, trap the shifting material in these spaces and function in a similar way should any of the material 21 itself partake of any shift as it might, for example, due to increased viscosity resulting from higher temperature.

In this latter connection, it is preferred to terminate the region of the material 21 some distance inwardly from the innermost ends of the inserted safety terminals 27 to provide an uncoated area, indicated at Y in Figure 4, over which the moving material 21 must spread and thin itself out, and thus slow up or stop its continued flow, before it reaches a possible point of entry into the safety terminal 27 itself.

Where the safety terminal has an end wall or closing flap like the wall 28ᵇ with an aperture in the latter, the portions of the wall 28ᵇ that surround the aperture 37 (see Figures 4 and 6) act as final barriers against the free egress of any material from the device, and it will be noted that this action is achieved regardless of which wall of the device 19 is treated as the bottom wall.

The fibres 22, carrying the particles of the powdered material, make it possible to achieve very wide distribution of the poisonous material, thus materially enhancing the chances of contact therewith or partaking thereof by the roach or the like, and they also act to break up or to materially lessen the possibility of accumulation of powdered material, where such is employed, in a more or less restricted mass; in the latter connection, handling or turning over of the device effects shifting of any accumulated mass of powdered material only to be caught up by and redistributed throughout the mass of fibres.

As above noted, the fibres 22, according to their characteristics and if long enough, may if desired overlap beyond the edges $21^a$—$21^b$ of the material 21. With the inwardly converging trapezoidal flaps, the latter may act also as retainers to catch and retard or hold any individual fibres that may become loosened or broken off, and should any fragments of fibres appear, they become trapped against exit much in the way that the otherwise loose poisonous powdered material is trapped, as above described.

It will thus be seen that there has been provided in this invention a device in which the various objects heretofore noted together with many thoroughly practical advantages are successfully achieved. It will be seen that the device is of simple construction, may be easily fabricated, is of dependable action and has a high factor of safety in handling both before, during and after use.

As many possible embodiments may be made of the mechanical features of the above invention and as the art herein described might be varied in various parts, all without departing from the scope of the invention, it is to be understood that all matter hereinabove set forth, or shown in the accompanying drawing, is to be interpreted as illustrative and not in a limiting sense.

I claim:

1. A device of the character described comprising a tube-like housing of substantial length and having an entrance opening at each of its two ends, the interior wall surface having spread thereover an adhesive food lure substance throughout a restricted area the bounding lines of which are spaced substantially from the two ends of said housing, a mass of loosely arranged fibres within said housing and held against shifting lengthwise thereof by said adhesive substance, a poisonous material in powdered form loosely carried by the surfaces of said fibres, and a safety terminal structure at each end of said housing and positioned internally thereof and presenting inwardly of the ends of said housing means for trapping loosened particles of said powdered material as are not caught by said adhesive substance and which might tend to shift toward the ends of the housing and for trapping such portions of said adhesive substance as tend to migrate toward the housing ends.

2. A device of the character described comprising a housing having an entrance opening in a wall thereof and having therein and spaced inwardly from said opening a mass of intermingled fibres arranged substantially indiscriminately and in sufficient looseness to permit a roach or the like to burrow into the mass and to provide between and amongst them elongated interstices to permit a roach or the like to make its way along said interstices in the mass, a poisonous material carried by fibres of the mass, and means interposed between the mass and said entrance opening providing a substantially uninterrupted passageway for roaches or the like and disposed for catching particles or portions of the poisonous material migrating toward said entrance opening.

3. A device of the character described comprising a housing having an entrance opening in a wall thereof, said housing having therein and spaced inwardly from said opening a mass of intermingled fibres arranged substantially indiscriminately and in sufficient looseness to permit a roach or the like to burrow into the mass and to provide between and amongst them elongated interstices to permit a roach or the like that has passed through said opening to make its way along said interstices in the mass, an interior wall element of said housing having thereon a substance having adhesive qualities and holding said mass of fibres against material displacement within said housing and toward said opening, and a poisonous material positioned to be accessible to a roach or the like upon travel thereof within said mass of fibres.

4. A device as claimed in claim 3 in which said poisonous material is carried by or is an ingredient of said substance thereby to provide poisonous material on said interior wall element should the path of burrowing of the roach or its movement along interstices lead it to said wall element as a barrier.

5. A device as claimed in claim 3 in which said poisonous material is on fibres of said mass, said substance acting through its adhesiveness to catch and retain particles of the poisonous material that come off the fibres.

6. A device as claimed in claim 3 in which said substance is in the form of a sticky syrup of low viscosity and functions also as a food lure and whereby, due to its sticky characteristic, it may catch and retain loose or migrating particles of the poisonous material.

7. A device as claimed in claim 3 in which said substance is in the form of a pasty mass and engages and holds adhesively certain of the fibres and has other fibres substantially embedded therein, said substance having thereby also the capacity of adhesively catching or holding loose or migrating particles of the poisonous material.

8. A device of the character described comprising a tube-like housing having means at one end forming an entrance opening and having therein and spaced inwardly from said opening a mass of relatively flexible fibres massed together substantially indiscriminately for thereby receiving mutual support from one another and arranged relatively loosely with respect to one another to thereby provide a plurality of indiscriminately extending and directed interstices therebetween for the passage of roaches or the like and a poisonous material in powder-like form carried by fibres of said mass, and means extending from said entrance opening in a direction toward said mass of fibres for retarding movement of poisonous material toward said entrance opening and for retarding migration of fibres or particles thereof toward and out of said entrance opening.

9. A device of the character described comprising a tube-like housing, a poisonous material within said housing and having means comprising a mass of relatively loosely arranged fibres for substantially retaining said poisonous material in a region within the housing spaced inwardly from an end of said housing, a safety terminal device comprising a tube-like structure of sheet material having a closure wall at one end, said structure being inserted into said end of said housing with the closure wall thereof positioned to close off said housing at said end and means for holding said inserted structure in position with said closure wall thereof closing off said housing at said end, said tube-like structure having means to oppose movement of poisonous material to said closure wall and said closure wall having readily releasable means for providing an entrance opening therethrough.

10. A device of the character described comprising a tube-like housing having therein a mass of fibrous material into which a roach or the like may make its way and having related thereto a poisonous material that is accessible to a roach entering said mass, said housing having an entry opening at an end of said housing, a safety terminal device comprising a tube-like structure of sheet material with the walls thereof resting against the walls of said housing adjacent said end, said tube-like structure having extending inwardly of the housing wall portions spaced from the interior walls of the housing by an amount to avoid substantial discontinuity of passageway for a roach or the like from the inside face of said wall portions of said tube-like structure onto said interior walls of the housing and sufficient to provide therebetween a space that extends all around the internal periphery of the housing for trapping migrating poisonous material.

11. A device as claimed in claim 10 in which said wall portions of said tube-like structure are in the form of tapered flap elements bent inwardly toward the axis of said tube-like housing to give said space a tapered shape, and tape-like means securing said flap elements together and in inwardly bent position.

12. A device of the character described, comprising a housing having an entrance opening in a wall thereof for entry into the housing of a roach or the like, said housing having therein a mass of fibres substantially indiscriminately arranged with respect to one another so that fibres of the mass mutually support one another, said mass being of a cross-section substantially the same as the cross-section of said housing, said mass having its fibres associated together with sufficient looseness to provide interstices therebetween and to permit a roach or the like to make its way along or through interstices between and amongst the fibres of the mass, and a poisonous material carried by the fibres of the mass and capable of being rubbed off of the fibres as the roach or the like comes into forced engagement with the fibres as it makes it way into the mass.

ALEX WEIL.